Patented Jan. 5, 1937

2,066,954

UNITED STATES PATENT OFFICE 2,066,954

C-NITROTETRAZOLE COMPOUNDS

Edmund von Herz, Cologne-Dellbruck, Germany

No Drawing. Application July 8, 1932, Serial No. 621,523. In Germany July 10, 1931

10 Claims. (Cl. 260—11)

My invention relates to a process of producing new explosives and to the new explosives obtainable by said process, more particularly it relates to nitrotetrazole of the formula:

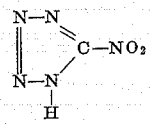

and the salts and esters thereof. The object of my invention is further to provide new and useful explosive compounds suitable for use in priming compositions for detonators and percussion caps.

The C-nitrotetrazole which was hitherto unknown cannot be obtained by direct nitration of the tetrazole. The reason therefor may be that the hydrogen atom which is to be substituted is negatively influenced by the strongly acid tetrazole nucleus. Therefore, there was a doubt as to the possibility of the existence of this nitro compound.

It has now been found that the nitrotetrazole can be obtained in a surprisingly smooth reaction by the method of Sandmeyer when reacting upon an aqueous diazotetrazole solution in the presence of finely divided copper or a copper compound with excess nitrous acid at low temperatures, say between 0° C. and 30° C. Thus it becomes possible to manufacture this compound on a large scale easily and in an excellent yield.

The starting aminotetrazole from which the diazotetrazole is produced in the usual manner by diazotization has been described in literature, see, for instance, Behrichte der deutschen chemischen Gesellschaft, vol. 62, page 1120, my new process being illustrated by the following equation:

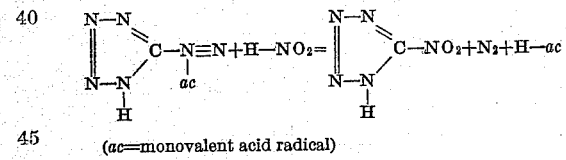

(ac=monovalent acid radical)

As the separation of the nitrotetrazole from the reaction liquid advantageously takes place over the acid copper salt, it is suitable to work with a dissolved copper salt which precipitates the nitrotetrazole formed as a difficultly soluble acid copper salt. The best results are obtained when using an aqueous solution of copper nitrite prepared by simultaneously dissolving in water copper sulfate and sodium nitrite. This solution immediately reacts with the diazo solution with the evolution of nitrogen.

In order to avoid too strong a dilution of the reaction liquid required due to the high explosiveness of the diazotetrazole even in rather dilute aqueous solution, which would render the working up of the reaction mass rather difficult and expensive, it is advisable not to prepare these solutions separately, but to unite the two reactions— that of the diazotization and that of the replacement of the diazo group by the nitro group—in one working process in such a manner that the diazo compound formed immediately reacts with excess copper nitrite. This process is best carried out in such a way that by and by with the preceding reaction an acid aminotetrazole solution is poured into a copper nitrite solution containing such an amount of excess sodium nitrite as is required for diazotization. Thus it is possible to work with rather concentrated solutions and to avoid with certainty concentrations of the diazonium compound which can be dangerous.

The invention is illustrated by the following examples without being restricted thereto:

Example 1

A solution of 103 grams of aminotetrazole (containing crystal water) and 30 ccs. of concentrated sulfuric acid in 2 liters of water is by and by poured into a solution of 160 grams of sodium nitrite and 100 grams of copper sulfate in one and a half liters of water in a thin jet and with strong stirring. During the first part of the process the solution is cooled, then the temperature is allowed to rise. After all of the solution has been poured in and nitrogen is no longer developed, 90 ccs. of sulfuric acid are added, and the solution is cooled. By the voluminous acid copper salt of the following composition:

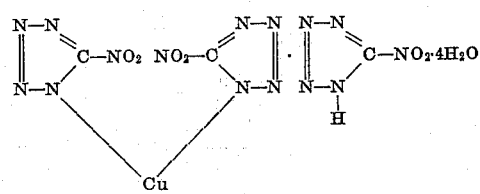

which crystallizes in thin light blue needles, the liquid solidifies finally to form a thin paste. After the separation of the mother lye, the copper salt is first washed with strongly dilute sulfuric acid and then with water until free from sulfuric acid. In this form it can be employed for the preparation of further salts and the free nitrotetrazole. The yield of copper salt amounts to about 90% of the theory.

The sodium salt crystallizing with 4 molecules of crystal water is obtained by treating copper salt in boiling aqueous solution or suspension with soda lye, filtering off of the copper oxide and evaporating and crystallizing of the filtrate. It may be used as starting material for the preparation of the other salts.

The free nitrotetrazole is prepared by decomposition of the copper salt in a warm aqueous suspension with hydrogen sulfide, extraction with benzene or acetic ester of the copper-free filtrate, which has been evaporated until sirup consistency is attained, and evaporation of the extracts in a vacuo exsiccator. It is obtained as a white very deliquescent crystal mass, the melting point of which on account of these properties could not as yet be ascertained definitely.

The very explosive nitrotetrazole possesses the properties of a very strong acid and decomposes the salts of mineral acids, and therefore cannot be liberated from its salts by acids. The salts of the silver, quicksilver, copper, nickel and cobalt are difficultly soluble, the salts of the other metals are rather readily soluble. Also the esters of the nitrotetrazole may readily be prepared, thus, for instance the methyl ester by acting with dimethylsulfate upon the sodium salt of the nitrotetrazole.

Example 2

The difficultly soluble silver-, mercury-, nickel- and cobalt-salts are prepared in the customary manner by precipitation of solutions of readily soluble salts of the named metals with a sodium nitrotetrazole solution, preferably in the presence of some free acid.

Mercury salt 340 grams of mercury nitrate are dissolved with 35 ccs. of nitric acid (spec. grav. 1.4) in 3 liters of water, and into this clearly filtered solution which is heated to about 70° C. the solution of 418 grams of sodium nitrotetrazole in 2 liters of water is poured in the course of half an hour with strong stirring. The temperature is possibly kept at the above mentioned temperature and only reduced to room temperature when all the nitrotetrazole solution has been poured in; the stirring must be continued to the end. The separating mercury salt is filtered off and washed with water until neutral.

The mercury salt is a heavy, granular crystal powder of very good loading power, difficultly soluble in water but more readily soluble in water than the silver salt. It is not attacked by nitric acid. It detonates at about 215° C. and possesses the same sensitiveness to percussion as the fulminating mercury.

Silver salt

The silver salt crystallizes in white, felty needles, having a striking resemblance with the crystals of the silver fulminate. It is difficultly soluble in water and remains completely stable in nitric acid solution. It detonates at about 230° C. and is a little more sensitive to percussion than the fulminating mercury.

Nickel and cobalt salt

The nickel- and cobalt-salts are practically insoluble in water and are not decomposed by acids. They are both of reddish-white color and are obtained as microcrystalline precipitate. In order to transform them into a form suitable for loading purposes they must be granulated with a binding agent. They detonate at about 220° C. and resemble, as regards sensitiveness to percussion, the fulminating mercury.

Basic lead salt

The basic lead salt is prepared by saturating a 10% solution of free nitrotetrazole of 80° C. with the double equivalent quantity of freshly precipitated lead hydroxide. The hot solution is rapidly filtered and cooled by and by with good stirring, whereby the basic lead salt of the formula:

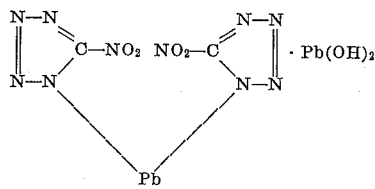

crystallizes out which is further treated in the usual manner as described above.

The basic lead salt is a heavy, granular crystal powder of yellowish white color, being difficultly soluble in cold water and rather readily soluble in hot water. It detonates at about 220° C., but is a little more sensitive to percussion than the fulminating mercury on account of its brittleness.

The salts and esters thus produced are to be used for the preparation of initiating explosive substances.

Up to the present time as initiating primers for detonators and percussion caps metal salts of the most varied tetrazole derivatives have been proposed. If these salts made no way in the technique, it was for the reason that their properties were insufficient, viz: insufficient safety in handling, as in the case of tetrazoleazide, instability of the diazoaminotetrazole and an insufficient effect of the salts of azotetrazole.

In accordance with the present invention the above described salts and esters of the C-nitrotetrazole has been found to be extraordinarily effective, stable and thoroughly safe initiating explosives which show a considerable advantage over the fulminating mercury and lead azide utilized so far. The free C-nitrotetrazole is very explosive but practically does not come into consideration as explosive on account of its hygroscopicity. The salts in the water-free state are of the character of the initiating explosives but with regard to their practical use the choice of many of these salts is somewhat limited on account of the water solubility and the crystal water content.

Of the water-soluble salts the sodium salt is of importance as starting material for different heavy metal salts, as stated above.

For the technical use as initiating primers the water-insoluble heavy metal salts and first of all the silver-, mercury- and basic lead-salt come into consideration.

The initiating power of these salts is considerable and, compared with the loading limits, even exceeds the initiating power of the lead azide. These loading limits against tetryl amount to in the case of:

| | Grams |
|---|---|
| Lead azide | 0.02 |
| Basic lead nitrotetrazole | 0.02 |
| Mercury-nitrotetrazole | 0.006 |
| Silver nitrotetrazole | 0.005 |

In contrast with the lead azide the nitrotetrazole salts possess the advantage of a good inflammability and stability against carbonic acid. They are chemically completely stable no matter where they are stored, and their inflammability is not influenced by moisture. By their strong initiating effect they are especially suitable for sensitizing of weaker initiating explosives or of such explosives which, on account of their small releasing velocity, ordinarily do not belong to the class of decided initiating explosives. Thus, for example, the loading limit of the fulminating mercury against tetryl is reduced by the addition of 10% of mercury nitrotetrazole from 0.23 gram to 0.04 gram, and by the addition of 20% of mercury nitrotetrazole to even 0.02 gram. Lead trinitroresorcinate becomes an effective initiating explosive with a loading limit of 0.03 gram with a content of 20% of mercury nitrotetrazole. Most surprisingly, also the esters of the nitrotetrazole possess a good initiating power though the same is not as strong as in the case of the salts. For example, the methyl ester shows a loading limit of 0.1 gram against tetryl. On account of their fusibility the esters are, however, a little slow in their inflammability; they therefore require a stronger igniting flame, or an especial priming load must be set on.

The favorable combustion conditions of the nitrotetrazole salts and esters result in unusually high explosion temperatures which exert an especially favorable effect also in the manufacture of priming compositions for primers and other percussion caps in ammunition. To further raise the thermic effect and temper the shattering power the salts and esters are combined in the customary manner with oxygen carriers, combustible substances, friction means, etc. Any kind of sensitizing addition as is required in the case of lead trinitroresorcinate is not necessary on account of sufficient sensitiveness to percussion.

The use of these nitrotetrazole salts and esters is therefore of great advantage in the manufacture of detonators and percussion caps.

I wish it to be understood that the neutral salts as well as the acid and basic salts of C-nitrotetrazole are included in my invention.

I claim:—

1. In the process of preparing C-nitrotetrazole, the step which comprises treating diazotetrazole in dilute aqueous solution with excess nitrous acid in the presence of a water-soluble copper salt in accordance with the method of Sandmeyer.

2. Process according to claim 1, in which the reaction is performed in the presence of such a quantity of a water-soluble copper salt as is required for producing the acid copper salt of the nitrotetrazole formed.

3. Process according to claim 1, in which the reaction is performed in the presence of such a quantity of copper nitrite as is required for producing the acid copper salt of the nitrotetrazole formed.

4. In the process of preparing C-nitrotetrazole, its salts and esters, the step which comprises introducing an aqueous solution of C-aminotetrazole into an aqueous copper nitrite solution containing such a quantity of excess sodium nitrite as is required for the diazotization of the amino group of the aminotetrazole.

5. As a new product a compound of the group consisting of C-nitrotetrazole, the heavy metal salts and alkyl esters thereof.

6. As new products heavy metal salts of C-nitrotetrazole, being water-soluble to insoluble, and being valuable for initiating explosives for priming compositions for detonators and percussion caps.

7. As new products water-insoluble heavy metal salts of C-nitrotetrazole, being valuable for initiating explosives for priming compositions for detonators and percussion caps.

8. As a new product the silver salt of C-nitrotetrazole, forming white felty needles, being difficultly soluble in cold water, being valuable for initiating explosives for priming compositions for detonators and percussion caps.

9. As a new product the acid copper salt of C-nitrotetrazole of the formula:

$$Cu(CNO_2N_4)_2-(CNO_2N_4H)-4H_2O$$

crystallizing in thin light blue needles, difficultly soluble in cold water, being valuable for initiating explosives for priming compositions for detonators and percussion caps.

10. The basic lead salt of the formula:

$$Pb(CNO_2N_4)_2 \cdot Pb(OH)_2,$$

being a heavy, granular crystal powder, difficultly soluble in cold water, being valuable for initiating explosives for priming compositions for detonators and percussion caps.

EDMUND VON HERZ.